Figure 1:
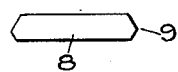

Jan. 3, 1933.      C. A. PIERCY      1,893,376

HIGH TENSION POWER TRANSMITTING ELECTRIC CABLE

Filed Jan. 14, 1931

Inventor:
Carl A. Piercy,
by Charles E. Tullar
His Attorney.

Patented Jan. 3, 1933

1,893,376

UNITED STATES PATENT OFFICE

CARL A. PIERCY, OF BALLSTON LAKE, NEW YORK, ASSIGNOR TO GENERAL ELECTRIC COMPANY, A CORPORATION OF NEW YORK

HIGH TENSION POWER TRANSMITTING ELECTRIC CABLE

Application filed January 14, 1931. Serial No. 508,730.

The present invention relates to the insulation of electric cables, and more especially to the so-called solid-type of cable, but it is also applicable to cable of the so-called fluid-filled type. As commonly constructed for the present purpose the conductor is spirally wound or wrapped with tapes or ribbons of insulation made of fibrous material, such as paper or cambric, the edges of which are smooth and are separated by a small but appreciable space or clearance. The insulation so applied is subsequently encased in a lead sheath. The insulation is applied layer by layer until the desired thickness is obtained. The tapes or ribbons are so applied that the said small space between the turns of one layer is fully covered by the body of the next outer turn. In other words, the tapes are applied in such manner as to break joint. Either before or after the sheath is applied the insulation is treated to remove the gas and moisture contained therein and is thoroughly impregnated with a fluid insulation which may be heavy oil or compound in the case of solid-type cable and a thinner oil in the case of fluid-filled cable. The sheath forms a protective covering and serves also to confine the impregnating fluid and prevent the entrance of foreign matter.

Owing to the presence of the small but appreciable narrow spaces or gaps between edges of adjacent turns of the same layer of insulation, the compound or fluid contained therein when the cable is carrying its electric load and is thereby heated, drains to a greater or less extent from the upper to the lower side of the cable, assuming it be horizontal or approximately so. This has the effect of forming numerous small voids or vacuum spaces on the upper side of the cable in which ionization takes place. As is well understood ionization takes place at a much lower voltage in a void than at other points or regions containing fluid insulation. The presence of voids is usually not immediately noticeable unless of large size, but after a period of time the small vacuum pockets or voids will start local heating and later glowing or arcing and in so doing cause the compound to move or flow therefrom. Finally, a condition is reached where a number of the small voids become connected and thus form an ionized path from the metal conductor to the lead sheath, which in the course of time will cause a burn-out or failure of the cable.

I have discovered, and confirmed the same by test, that by suitably preparing the edges of the tapes or ribbons of insulating material the possibility of voids occurring between them is reduced to a marked degree, if not eliminated.

For a consideration of what I believe to be novel and my invention, attention is directed to the accompanying description and the claims appended thereto.

Figure 3:
Figure 2:
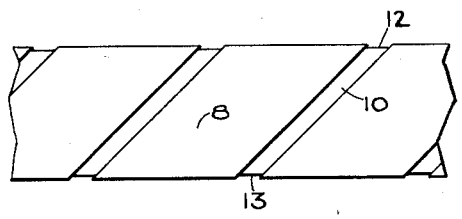
Figure 4:
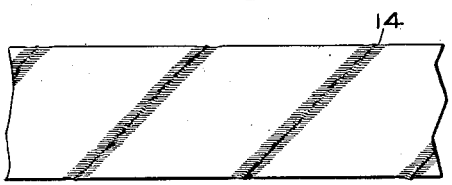
Figure 5:
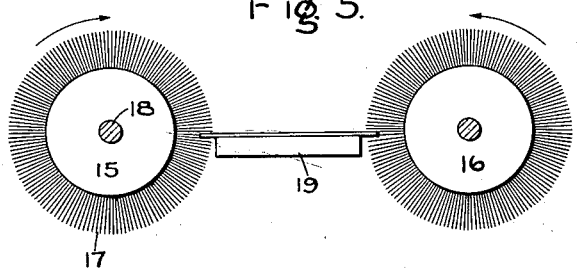
Figure 6:
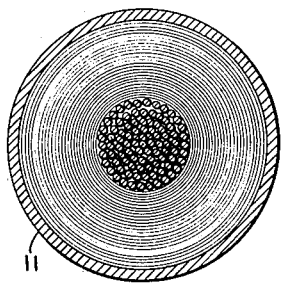

In the drawing which is illustrative of my invention, Fig. 1 is a cross section of an ordinary paper ribbon or tape on a greatly exaggerated scale; Fig. 2 is a side view of a piece of cable as commonly constructed for high voltage transmission with paper tape of the kind shown in Fig. 1; Fig. 3 illustrates on an exaggerated scale a cross-section of my improvement as applied to paper tape; Fig. 4 is a side view of a piece of cable insulated with my improved tape; Fig. 5 illustrates a machine for treating the edges of the tape; Fig. 6 is a cross-section of a completed cable, and Fig. 7 the tape is shown as having only one fuzzy or brush like edge.

In Fig. 1 is illustrated in cross-section a piece of paper tape 8 such as is ordinarily used in insulating cable conductors. The edges are generally somewhat beveled as at 9 due to the action of the cutters above and below the sheet from which the tape is formed, and in any event the edges present smooth and unbroken surfaces. When the tape is spirally wrapped around the conductor in the customary manner relatively narrow but appreciable spaces or gaps 10 are left between edges of adjacent turns of the tape in the same layer. These gaps have been exaggerated in Fig. 2 in the interest of clearness of illustration. It is to be understood that these spiral spaces or gaps appear between the turns or wraps of each under layer as well as at the outer layer. As a general proposition the gaps between turns are smallest near the conductor and progressively increase toward the periphery, but in all cases they are relatively narrow. The sheath is omitted from Figs. 2 and 4 in the interest of clearness of illustration, but in both cases the cable is enclosed in a lead or equivalent sheath 11 as shown in Fig. 6. These spaces or gaps are left between turns so that the successive layers of tape may smoothly and evenly be applied. They also facilitate bending of the cable when being reeled and later when being installed in a conduit, as the turns may slide one on the other to a limited extent and thus prevent buckling or tearing of the edges.

When the cable is heated by reason of electric current flowing through it, the compound or other fluid is also heated and gets thinner, and if the space or gap is not completely filled with fluid and so maintained, the fluid will slowly move from the upper side of the cable or part 12 to the lower or part 13, and as a result voids or pockets are formed at the upper side which correspond more or less to the width of the space, their length depending upon the amount of fluid in the gap when considered as a whole. Their thickness depends upon the thickness of the paper tape.

I avoid the objection above noted by specially preparing the edges of the tape 8 so that there is no clear cut definite space between the edges of adjacent turns but on the other hand the space between them is largely or wholly occupied by more or less entangled and endwise presented fibers which by their nature and that of the liquid or fluid insulation hold or prevent it from flowing downward. This advantageous feature is obtained by making both edges of the tape fuzzy, as indicated at 14, the side surfaces being smooth and hard as usual. Due to the fact that the edges are so treated they may be applied over the conductor in such relation that what otherwise would be an appreciable space or gap is filled or nearly so with individual fibers of the insulation which is usually paper. The presence of these edgewise projecting fibers which are softer than the main body of the tape means that the next outer layer may be applied evenly and smoothly in place, and if any fibers project upwardly by a small amount above the surface, as one layer is applied, the pressure applied by the next layer will flatten them into the space or gap. The fact that the edges of the tape are by my invention made softer than the main body means that the flexibility of the cable as a whole is in no wise affected, because any slight movement of one turn merely changes to a slight degree the pressure exerted by one set of fibers on another.

The edges of the paper may be treated by simple attachment to an ordinary paper slitting machine, as shown in Fig. 5. Between the cutting knives and the winding rolls are small disks 15 and 16 having steel bristles or equivalent means 17 which are rotated toward each other by the driving shafts 18. The paper tape is supported by and drawn over the steel plate 19 under the usual tension employed in such slitting machines. The rotation of the steel bristles in engagement with the edges of the tape breaks down the structure of the tape at said edges and some of the shorter fibers will be removed. As a result, the edges of the tape which on leaving the cutting knives were smooth and unbroken, are now fuzzy or brush like, and when applied over the conductors the fibers of one turn or wrap are entangled to a greater or less degree with the fibers of the adjacent turn. Because the space or gap is eliminated, or practically so, it follows that the liquid or fluid insulation is no longer free to move in an unrestricted manner from the upper to the lower side of the cable.

Tests show that by utilizing the fuzzy edged tape of my invention, the resulting cable by reason of the improved insulation will have a longer life and lower power factor characteristic, thus making a more economical cable.

Because the tape can be treated in the same machine that slits the paper, and because it can be done while the slitting operation is taking place, it follows that the fuzzing operation costs nothing beyond the small cost of the bristle brushes, and slight attention to their proper setting and condition as to wear.

It is desirable that the individual fibers of one turn or wrap of paper engage those of the adjacent turn, but if the impregnating compound has considerable surface tension it will suffice if the individual fibers are near enough to hold the compound between them. The cohesive and adhesive properties also have a bearing, factors which vary of course with different impregnating fluids.

Figure 7:
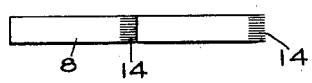

In carrying out my invention it is unnecessary to use any special kind of paper, that now being used for insulating cable conductors being suitable for the purpose. One way to consider my invention in its broader aspect is that the paper tape has a main body portion which is relatively hard and dense while the extreme edges thereof are so treated mechanically as to render them relatively soft and pliable. I have described both edges of the tape as being made fuzzy but under some circumstances only one edge may be so treated and the other left smooth. In such a case the fuzzy edge of a tape is presented to the smooth edge of the adjacent turn, as shown in Fig. 7. However, it is best to treat both edges and the cost thereof is no greater in one case than in the other. When only one edge is treated it can with advantage have a somewhat greater depth at fuzz than where both edges are so treated.

I have shown the invention in connection with single conductor cable, but it applies equally well to multi-conductor cable.

What I claim as new and desire to secure by Letters Patent of the United States, is:

1. An electric cable comprising a conductor, spirally wrapped tape insulation thereon with small clearances between turns, said tape having a hard surface central body and a fuzzy edge, the fuzz on said edge serving to restrict the movement of impregnating fluid in the clearance between turns, a fluid for impregnating the tape, and an enclosing impervious sheath.

2. An electric cable comprising a conductor, hard surface tapes of fibrous insulation spirally wound thereon in layers with a small gap between turns, both edges of said tapes being fuzzy and so applied that the fibers of adjacent turns are entangled, a body of insulating fluid impregnating the fibrous insulation, and an enclosing metallic sheath to retain the impregnating fluid.

3. An electric cable comprising a conductor, layers of spirally wrapped tape insulation thereon with small clearances between the turns of each layer, said tape having a hard surface central body, the edges of the tape having fuzzy edges, the fuzz on said edges serving to prevent the free movement of impregnating fluid, an impregnating fluid, and an enclosing metallic sheath.

4. An electric cable comprising a conductor, a body of impregnating fluid insulation, hard surface paper tape spirally wrapped around the conductor to form concentric layers, the edges of said tape being fuzzy, the fuzz on one turn being presented in edgewise relation to that on an adjacent turn in the same layer to retain said body of insulation between them, and an enclosing metallic sheath.

5. An electric cable comprising a conductor, insulation for the conductor comprising successive layers of paper tape spirally wrapped around the conductor, the body of the tape being relatively hard and dense and the edges thereof relatively soft and in close proximity, said layers being arranged to break joint, a body of fluid insulation with which the paper tapes are impregnated, and a metallic sheath which encloses the insulation and confines the fluid insulation.

6. An electric cable comprising a conductor, hard surfaced paper tape applied directly to the conductor in the form of spirally wrapped layers, the edges of the paper being beveled and also fuzzy whereby the gap between the turns may be reduced and prevent free movement of the insulating fluid, an insulating fluid impregnating the paper and filling all of the spaces between turns to the substantially exclusion of ionizable voids, and a metallic sheath for confining the fluid.

In witness whereof, I have hereto set my hand this 13th day of January, 1931.

CARL A. PIERCY.